United States Patent
Buchter et al.

(10) Patent No.: US 10,641,712 B2
(45) Date of Patent: May 5, 2020

(54) PROCESS AND APPARATUS FOR SORTING REUSABLE PIECES OF RAW MATERIAL

(71) Applicant: PROASSORT GMBH, Werdohl (DE)

(72) Inventors: Edwin Buchter, Herzogenrath (DE); Winfried Barkhausen, Aachen (DE); Hans-Bernd Pillkahn, Werdohl (DE)

(73) Assignee: Clean-Lasersysteme Gmbh, Herzogenrath (DE)

( * ) Notice: Subject to any disclaimer, the term of this patent is extended or adjusted under 35 U.S.C. 154(b) by 0 days.

(21) Appl. No.: 15/508,674

(22) PCT Filed: Sep. 10, 2015

(86) PCT No.: PCT/EP2015/070746
§ 371 (c)(1),
(2) Date: Mar. 3, 2017

(87) PCT Pub. No.: WO2016/038153
PCT Pub. Date: Mar. 17, 2016

(65) Prior Publication Data
US 2017/0261437 A1  Sep. 14, 2017

(30) Foreign Application Priority Data

Sep. 11, 2014  (DE) .......................... 10 2014 013 160

(51) Int. Cl.
*B07C 5/34* (2006.01)
*G01N 21/71* (2006.01)
(Continued)

(52) U.S. Cl.
CPC ........... *G01N 21/718* (2013.01); *B07C 5/342* (2013.01); *B07C 5/3427* (2013.01); *G01J 3/443* (2013.01);
(Continued)

(58) Field of Classification Search
CPC .................. B07C 5/342; B07C 5/3427; B07C 2501/0054; G01N 21/718;
(Continued)

(56) References Cited

U.S. PATENT DOCUMENTS 5,042,947 A  8/1991 Potzschke et al.
5,847,825 A * 12/1998 Alexander ........... G01N 21/718
356/318

(Continued)

FOREIGN PATENT DOCUMENTS

DE   4426475 A1   2/1995
DE   10361727 B3   7/2005
WO   2015077867 A1   6/2015

OTHER PUBLICATIONS

International Search Report of the International Searching Authority with English Translation issued in the corresponding PCT International Application No. PCT/EP2015/070746, dated Dec. 21, 2015 (7 pages).

(Continued)

*Primary Examiner* — Joseph C Rodriguez
(74) *Attorney, Agent, or Firm* — Raymond R. Ferrera; Adams and Reese, LLP

(57) ABSTRACT

A system for sorting reusable raw-material pieces, where the chemical composition of the raw-material pieces is analyzed by laser-induced breakdown spectroscopy (LIBS), where the raw-material pieces in a first step are subjected to a plurality of first laser pulses in order to remove surface coatings and/or contaminants from the raw-material pieces, and in a second step, one or more further laser pulses from the same laser are used to generate a plasma.

17 Claims, 1 Drawing Sheet

(51) Int. Cl.
*B07C 5/342* (2006.01)
*G01J 3/443* (2006.01)
*G01N 21/84* (2006.01)

(52) U.S. Cl.
CPC ...... *G01N 21/84* (2013.01); *B07C 2501/0054* (2013.01); *G01N 2021/845* (2013.01); *G01N 2201/06113* (2013.01)

(58) Field of Classification Search
CPC ..... G01N 2021/845; G01N 2201/06113; G01J 3/28; G01J 3/3443
See application file for complete search history.

(56) References Cited

U.S. PATENT DOCUMENTS

| | | | | |
|---|---|---|---|---|
| 6,008,897 | A * | 12/1999 | Sabsabi | G01N 21/718 356/318 |
| 6,610,981 | B2 * | 8/2003 | Sommer, Jr. | B07C 5/3416 250/339.01 |
| 6,661,511 | B2 * | 12/2003 | Detalle | G01N 21/718 356/318 |
| 7,821,634 | B2 * | 10/2010 | Dillon | G01J 3/02 356/318 |
| 8,319,964 | B2 * | 11/2012 | Hahn | G01N 21/718 356/318 |
| 9,339,849 | B2 * | 5/2016 | Pillkahn | B07C 5/342 |
| 9,703,166 | B2 * | 7/2017 | Luten | G02F 1/1533 |
| 9,714,864 | B2 * | 7/2017 | Day | G01J 3/0272 |
| 9,719,853 | B2 * | 8/2017 | Day | G01J 3/443 |
| 9,719,933 | B1 * | 8/2017 | Paproski | G01N 21/718 |
| 9,835,532 | B2 * | 12/2017 | Hall | G01N 1/44 |
| 9,855,588 | B2 * | 1/2018 | Gauthier | B07C 5/3427 |
| 9,909,923 | B2 * | 3/2018 | Wang | G01J 3/443 |
| 9,970,815 | B2 * | 5/2018 | Day | G01J 3/443 |
| 2003/0016353 | A1 | 1/2003 | Detalle et al. | |
| 2012/0015318 | A1 * | 1/2012 | Kasenbacher | A61C 1/0046 433/29 |
| 2012/0184055 | A1 * | 7/2012 | Kawakami | B23K 26/03 438/16 |

OTHER PUBLICATIONS

Written Opinion of the International Search Authority (Form PCT/ISA/237) with English Translation issued in the corresponding PCT International Application No. PCT/EP2015/070746, dated Dec. 21, 2015 (13 pages).

International Preliminary Report on Patentability Chapter I issued in the corresponding PCT International Application No. PCT/EP2015/070746, dated Mar. 14, 2017 (7 pages).

* cited by examiner

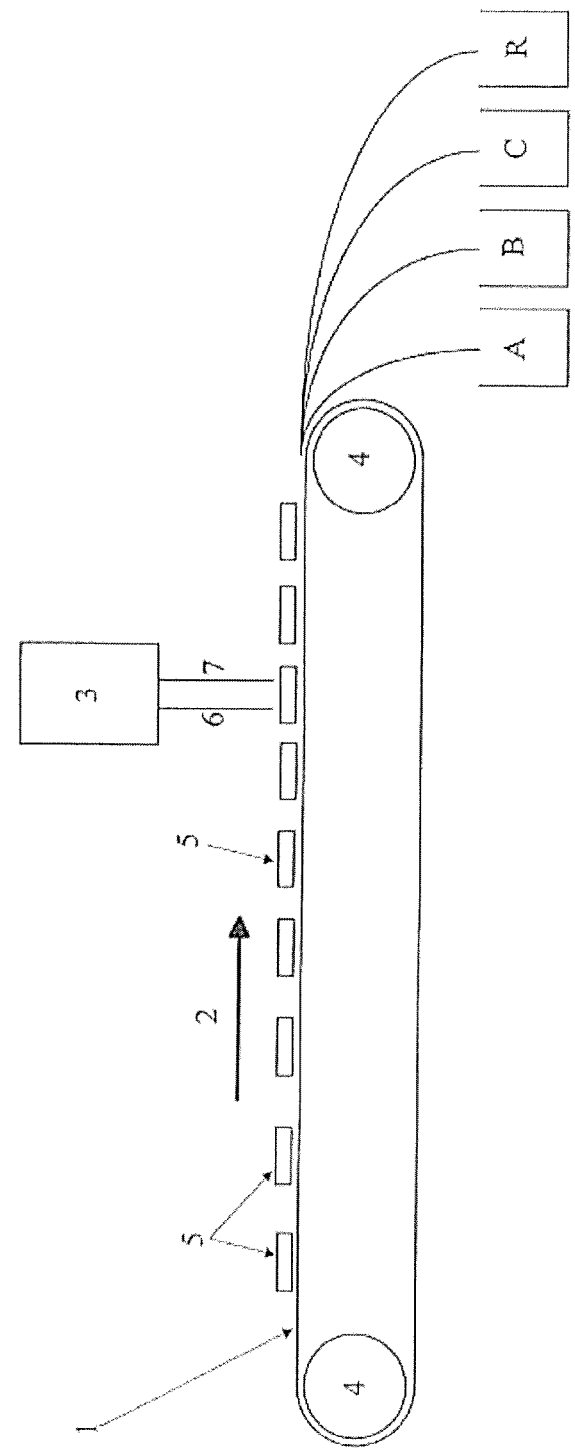

PROCESS AND APPARATUS FOR SORTING REUSABLE PIECES OF RAW MATERIAL

The invention relates to a process for sorting reusable raw-material pieces which are moved continually in conveying direction by a transport means, where the chemical composition of the raw-material pieces is analyzed by laser-induced breakdown spectroscopy (LIBS) and automated sorting of the raw-material pieces is implemented depending on the composition found, where the raw-material pieces in a first step are subjected to a plurality of first laser pulses in order to remove surface coatings and/or contaminants from the raw-material pieces, and in a second step, one or more further laser pulses are directed at those locations of the raw-material pieces from which the surface coatings and/or contaminants have been removed, with exposed material of the raw-material pieces being converted by the second laser pulses into a plasma and the laser used for the first and second laser pulses being the same. The invention further relates to an apparatus for implementing the process.

In times of increasingly scarce and more expensive resources, the re-use of secondary raw materials, in the form of scrap recycling, for example, is of considerable economic importance. This is the case all the more because large parts of the raw materials used come from foreign countries, which are unable always to ensure security of supply. Lastly, the re-use of secondary raw materials is desirable from an environmental standpoint as well.

The secondary raw materials are generally in the form of fractions which consist of a multiplicity of individual raw-material pieces. The individual fractions usually do not come from one individual drop site (location of production), but are instead composed of raw materials of different origin. Even the yield from one particular drop site may in turn feature different chemical compositions for the individual pieces. Overall, therefore, the individual fractions are usually presorted only according to different raw-material categories, such as association with a base material and dimensions, but differ, often considerably, in their chemical composition. Metal scrap, for example, is composed of individual parts with different alloy contents.

For the generation of high-performance materials from secondary raw materials, the exact chemical composition of the target melt is of upmost importance in the case of metallic materials. Mere presorting according to individual scrap groups may be sufficient for charge makeup, i.e. for smelting-oven charging, for relatively simple, commodity materials, but not for the production of high-performance materials (high-performance alloys, HPA), which have particular physical properties in terms of strength, wear and corrosion behavior, heat resistance, conductivity, etc. Furthermore, interfering alloy elements are currently still being widely slagged and hence ultimately destroyed, something which in the long term is acceptable neither economically nor environmentally.

Given the increasingly stringent requirements of materials, which are brought about by macro- and microalloying, new alloys with alloying components increasingly harmonized more precisely with one another are continually being produced. In the event of subsequent re-use, however, these alloying constituents may become noticeably disruptive, particularly if re-use takes the form of smelting in induction furnaces which do not allow metallurgical workup. For example, microalloying elements which make up high-strength sheet steel materials are disruptive to the formation of nodular graphite in a ferritic microstructure in the context of high-performance cast iron.

Therefore, only fractions of presorted secondary raw materials from the acquisition market are usually used for the target melt. These fractions are then blended with primary raw materials of known composition so as to set maximum permissible alloy contents and, in particular, to keep disruptive alloying constituents below a predetermined specification limit. For the purposes of having a functioning circular economy, however, it would be desirable to increase the fraction of secondary raw material.

For this purpose, the secondary-raw-material pieces must be sorted extremely accurately in terms of their composition. The sorting necessitates prior analysis of the chemical composition, which can be achieved, for example, by means of laser-induced atomic emission spectroscopy (laser-induced breakdown spectroscopy, LIBS). In such analysis, a small amount of the surface of material for analysis is vaporized and converted into a plasma. The light then emitted by the plasma is characteristic of the atomic composition. With the LIBS technique, however, it is ultimately only the surface of the solid that is analyzed; the analysis is therefore influenced by surface coatings or contaminants on the surface, meaning that the result of measurement is not representative of the overall composition of the piece of raw material analyzed.

In order to solve this problem, for example, DE 44 26 475 A1 proposes first directing a pulsed laser beam onto the surface layer in order to remove at least part of this layer, and in a second phase analyzing the exposed material by further laser pulses by means of LIBS. In addition, raw-material pieces moving forward during the analysis are to be analyzed by causing an optical guidance system to guide the laser beam synchronously with the movement on the measuring point of the moving object, so that the laser pulses for detaching the surface coating and for analyzing the composition are applied to the same location on the piece of raw material. This has the advantage, moreover, that there is no need for a second laser, thereby significantly reducing the costs of the apparatus as a whole, A problem which has emerged in this context is that distortions may arise if LIES analysis is performed in the marginal region of the exposed surface. Particularly in the case of relatively thick coatings, a kind of crater is formed at the surface, with the crater edge having elements of the coating or contaminants even after exposure to the laser pulses for detaching the surface. If the laser beam provided for the LIBS analysis strikes this crater edge, the result of measurement fails to match with the actual composition of the raw-material pieces, and in some cases an incorrect assignment is made. The plasma generated for the LIBS analysis may also be influenced by the crater geometry.

To solve this problem, DE 103 61 727 B3 has already proposed, when detaching the coating, to reduce successively the distance between the point of penetration of the laser beam axis through the sample surface and the point of intersection of the focal plane with the laser beam axis, and using a significantly smaller beam diameter for the actual analysis step. This ensures that the analysis pulses strike only the surface of the exposed regions, but do not experience disruption in the region of the crater edge, for instance.

A disadvantage which arises, however, is that varying the focal diameter requires relatively complex regulation of the laser. Furthermore, a large focal diameter has the effects of poor detachment of surface layers and a low laser pulse repetition rate, thereby slowing down detachment overall. Correspondingly, the operation as a whole is also slower, something which is undesirable, however, in the face of high throughput rates of raw-material pieces for sorting.

The object addressed is therefore that of providing a process for the sorting of reusable raw-material pieces, of the kind specified at the outset, that requires only one laser, that effectively removes surface coatings and contaminants, and that performs analysis of the composition of the raw-material pieces without distorting that analysis as a result of the detached surface coatings/contaminants.

This object is achieved in accordance with the invention by processes for sorting reusable raw-material pieces which are moved continually in conveying direction by a transport means, where the chemical composition of the raw-material pieces is analyzed by laser-induced breakdown spectroscopy (LIBS) and automated sorting of the raw-material pieces is implemented depending on the composition found, where the raw-material pieces in a first step are subjected to a plurality of first laser pulses in order to remove surface coatings and/or contaminants from the raw-material pieces, and in a second step, one or more second laser pulses are directed at those locations of the raw-material pieces from which the surface coatings and/or contaminants have been removed, with exposed material of the raw-material pieces being converted by the second laser pulses into a plasma, where the laser used for the first and second laser pulses is the same, and where the area of the raw-material pieces over which the first laser pulses are moved and which is freed from surface coatings and/or contaminants is greater than the area of the raw-material pieces that is embraced by the second laser pulses, the focal diameter and the focal point of the laser beam being kept constant between the first and second laser pulses.

In accordance with the invention, the first laser pulses (cleaning pulses) expose, on the raw-material pieces to be analyzed, an area which is significantly larger than the area subjected to the second laser pulses (analysis pulses). This effectively prevents the analysis pulses striking the crater edge and producing a distortion in the result. The intention here is to ensure that the first laser pulses overlap in such a way that no crater walls are formed on the cleaned surface and that this surface receives an adjustable fine structure. Also ensured is that even in the case of surface layers with a particularly high thickness of, for example, several tens to several hundreds of micrometers, sufficient laser light reaches the exposed surface and is reflected undisrupted by the surface to the detector. The terms "first laser pulses" and "cleaning pulses", and "second laser pulses" and "analysis pulses", are used synonymously below, respectively. In general, both the cleaning pulses and the analysis pulses comprise sequences of laser pulses. The focal diameter is the diameter of the laser beam at the focal point, i.e. its thinnest point (beam waist).

In contrast to DE 103 61 727 B3, where the focal diameter is constantly varied, it is kept constant in accordance with the present invention; instead, however, cleaning pulses act repeatedly on closely adjacent points of the raw-material pieces, the region exposed overall therefore being of comparable size.

Accordingly, the cleaning pulses "migrate" over the raw-material pieces until a sufficiently large region in sufficiently cleaned form is available for analysis. Overall, the area of the raw-material pieces that is freed from surface coatings and/or contaminants ought to be at least as great as the area of the raw-material pieces that is embraced by the analysis pulses, with the addition of an area enlargement. This area enlargement ought to be selected such that at least one focal diameter and the positional tolerances are covered in the context of the laser beam positioning. It is preferred for the area of the raw-material pieces that is freed from surface coatings and/or contaminants to be at least four times, preferably at least six times, as large as the area of the raw-material pieces that is embraced by the analysis pulses.

Depending on the nature and thickness of the surface coatings, it may be necessary for those regions of the raw-material pieces that are to be exposed to be subjected multiply to cleaning pulses. This ensures that, subsequently, an undistorted analysis of the composition is possible. Optionally, a multiple subjection may be preselected by the user; also conceivable, however, is that the apparatus for implementing the process of the invention self-learningly recognizes whether a further detachment of surface coatings/contaminants is necessary. This can be achieved, for example, by causing cleaning pulses to act on the surface until the subsequently applied analysis pulses yield a consistent result. In that case, in the event of multiple switching between first and second laser pulses (cleaning pulses and analysis pulses), with a very rapid pulse frequency and therefore closely spaced measuring points along a piece of raw material, the apparatus recognizes the surface nature of this piece of raw material.

Advantageously, the first laser pulses (cleaning pulses) are guided along at least two dimensions over the areas of the raw-material pieces that are to be freed from surface coatings/contaminants; in other words, the subjection takes place not only locally or along a line but instead, for example, in the length (x) and width (y) directions. In no dimension, correspondingly, is the measurement by means of the analysis pulses distorted.

As a result of switching between cleaning pulses and analysis pulses (first and second laser pulses), an individual laser can be used extremely effectively, even when the raw-material pieces are moved at high speed. A particular contribution to accelerating the process is made by keeping the focal diameter of the laser beam constant, so that, on the one hand, there is no need for costly and complex regulation between cleaning pulses and analysis pulses and, on the other hand, there is effective detachment of coatings and contaminants even in the case of the cleaning pulses, by virtue of the low focal diameter. The focal diameter of the laser beam here is several 10 µm to several 100 µm, preferably 60 to 140 µm.

After a part of the material of the raw-material pieces has been converted into a plasma, the emission from that plasma is fed to a spectrometer, typically via optical fibers. This spectral emission may make whole or partial use of the optical pathway of the laser emission means and may be outcoupled by wavelength-selective mirrors or optical elements, at an appropriate location, from the optical beam path of the laser means, and supplied to the spectrometer. The spectrometer then evaluates the atomic composition. Subsequently, depending on the composition, the raw-material piece is sorted to a target fraction or else is removed from sorting, if the raw-material piece proves unanalyzable or unusable. For each target fraction, particular stipulations are made concerning upper and lower limits for individual constituents, hence allowing the control unit of the system to decide in each case whether a raw-material piece must be assigned to one particular target fraction or else to a different target fraction.

Sensibly, the control unit ensures that the laser beam is guided in movement synchronicity with the movement of the raw-material pieces, as is known from publications including DE 44 26 475 A1. For this purpose it is possible in particular to use adjustable deflecting mirrors. The control unit takes account in particular of the movement of the raw-material pieces by the transport means and compensates the advance in the movement during processing by the laser means.

Laser pulse durations which have emerged as being suitable, both for the cleaning pulses and for the analysis pulses, are durations situated in the range of up to several 100 ns, more particularly in the range from 20 to 200 ns, preferably in the range from 60 to 120 ns. In this way, the laser pulses are suitable for the different objectives, namely removal of material on the one hand, and emission spectroscopy on the other.

In principle, however, it is also conceivable for the laser pulse durations for the cleaning pulses to be set longer than for the analysis pulses—for example, in the region of several microseconds for the cleaning pulses, and in the region of several nanoseconds for the analysis pulses. This can be achieved by appropriate control of the laser by means of a quality circuit or multiple quality circuit (Q-switch). The pulse energy between the first and second laser pulses can likewise be varied, so as to use a higher laser energy for the cleaning pulses than for the analysis pulses. Preferably, however, as described above, pulse duration and energy are kept constant between first and second laser pulses.

The plasma generated for the second laser pulses is preferably a thermal plasma. A plasma of this kind can be generated with the aid of solid-state lasers or fiber lasers. Such a laser exhibits penetration depths of several μm per laser pulse, thereby suppressing any surface effects.

The pulse frequency of the analysis pulses and preferably of the cleaning pulses as well is typically greater than 10 kHz and is situated preferably between 20 and several 100 kHz. These pulse frequencies have emerged as being particularly effective for the analysis of the composition and also for the cleaning.

The raw-material pieces are usefully moved at high speed; in particular, a conveyor belt may be employed. In this way, a correspondingly high throughput rate can be ensured, as is necessary for the sorting of large volumes of scrap or other secondary raw material. Found suitable for the process of the invention, in addition to static processing, are conveying speeds of the raw-material pieces of >0.1 m/s, preferably >2 m/s and more particularly of >3 m/s. In accordance with the invention, the composition of at least a major portion of the raw-material pieces, and ideally of each individual piece, ought to be analyzed, allowing precise sorting to take place even where fractions with different origins are mixed.

The raw-material, pieces are normally primarily secondary raw-material pieces, i.e., raw-material pieces for re-use. However, particularly in order to bring about a particular target composition, it is also possible as and when required to add only, or predominantly, primary raw-material pieces. Generally speaking, the raw materials are materials which can be incorporated by melting; ideally, they need only be melted in order to obtain a target melt of the desired composition, so that the admixing of further substances or removal of substances from the melt is no longer necessary or at most is necessary to a very small extent, in order to produce a new material. The raw-material pieces may comprise, in particular, metal scrap, especially steel scrap, since such scrap in volume terms accounts for a considerable portion of the reusable raw materials. In principle, however, the process of the invention can also be used for other scrap metal—including, in particular, aluminum, copper, zinc and titanium scrap. The process is particularly useful in the sorting of galvanized steel-scrap pieces, since these pieces have a comparatively thick surface coating which makes it impossible to analyze directly the composition beneath the surface coating. Also conceivable, however, is deployment in the recycling of plastics parts or glass. In this case, however, the process of the invention, which combines cleaning pulses and analysis pulses with one another, can be used for targeted analysis and sorting of the steel-scrap pieces, without the results being distorted by the galvanized zinc coating.

It is helpful if the raw-material pieces have been presorted in terms of their basic composition, such as with regard to the base material or the coat system, for example. Where the base composition is known, a decision may be made as to whether to treat the raw-material pieces with one or more liquids in order to clean the surface and/or to detach surface coatings, i.e., if stripping is necessary before the actual process of the invention is carried out. Here, various procedures may be sensible, depending on whether the material comprises, for example, plastics residues or scrap provided with a plastic coating or else galvanized or enameled scrap. Stripping agents used for removing organic coatings may comprise, for example, organic solvents such as aliphatic or aromatic hydrocarbons, chlorinated hydrocarbons, alcohols, glycol ethers, dicarboxylic esters, acetone, etc. A solvent used particularly frequently is methylene chloride. To remove a zinc coat, acids or bases may be used. Corresponding methods are known to the skilled person. A particularly effective treatment is that with liquids for cleaning the surface in a vibratory conveyor, like the subject of WO 2012/110239 A1. For a further increase in efficiency, the raw-material pieces for treatment may usefully be pretreated mechanically before being contacted with the liquid, and more particularly may be comminuted, shredded, roughened and/or otherwise deformed, in order to increase the surfaces for contact with the liquid. Prior to the analysis, optionally, drying of the pieces treated with the liquid may be carried out in order to remove adhering residues of liquid.

According to a further variant, the first laser pulses are directed at raw-material pieces which are further back in conveying direction, and the second laser pulses are directed at raw-material pieces which are further forward in conveying direction, there being a continual alternation between the subjection of raw-material pieces that are further back in conveying direction to first laser pulses and of raw-material pieces that are further forward in conveying direction to second laser pulses. This may be useful, because, immediately after the action of laser pulses for eliminating surface coats and contaminants, material detached from the coating/contamination is still located close to the piece of raw material to be analyzed, and this may be detrimental to precise analysis and may result in an incorrect assignment. The vaporization of organic surface coverings, oils, greases and lacquers, flakes of extraneous metal, tin or zinc finishing coats, oxide layers, and the like may be disruptively manifested here. On the other hand, at any rate when using only one laser system, as is desirable on grounds of cost, the waiting time installed between the cleaning pulses and the analysis pulses cannot be too long, since in the interim period, in the case of a high throughput, further raw-material pieces would pass through the LIBS system unanalyzed. The large quantity of raw-material pieces to be analyzed and sorted, which are moved at high speed on a conveyor belt, instead requires that the laser system be used almost continuously.

One way of countering this is for a control unit to ensure that, subsequent to the cleaning pulses, the analysis pulses act on a different piece of raw material which is further forward in conveying direction and for which detachment of the surface coating by means of cleaning pulses of the same laser has taken place shortly before. At the location where the analysis pulses act on the second piece of raw material, there are no longer, at this point in time, any surface coatings or contaminants, these having been removed by cleaning pulses in the previous step. For the second piece of raw material, accordingly, unadulterated analysis of the composition is now possible. In that case, of course, the control unit must ensure that the exposure to the analysis pulses takes place at the same location as the exposure to the cleaning pulses. This can be achieved by a corresponding means in the control unit which is required in particular to take account of and evaluate first of all the conveying direction and the conveying speed of the raw-material pieces and secondly the steering of the laser pulses. The laser beam can be aligned, for example, by means of deflection mirrors.

After the LIBS analysis on the second piece of raw material, the laser beam is again guided onto a piece of raw material for which first of all cleaning pulses are needed, in order to remove surface coatings/contaminants thereon. This is followed by renewed exposure to analysis pulses, either on the first piece of raw material or on a different piece of raw material, on which cleaning pulses have already acted beforehand. The entire procedure, i.e., the switch between first and second laser pulses, is therefore repeated continually in cycles.

It should, though, be mentioned that the switch described between the individual raw-material pieces proves unnecessary in the majority of cases, because, as a result of the procurement of an appropriately large area on the raw-material pieces that is accessible to analysis, distortions caused by residues of the detached surface coatings/contaminants are already largely ruled out. This simplifies the implementation of the process.

Depending on the size of the raw-material pieces, it may make sense for them to be comminuted prior to the compositional analysis, in order to render them easier to handle. There is a certain requisite minimum size for reasonable analysis of the composition to be possible. Since the analysis is frequently carried out by means of a laser having a focal spot with a diameter of around 50 to 400 μm, the minimum size of the individual raw-material pieces ought not to be less than 2 mm, the size in question referring to the two dimensions of the area of placement, on a conveyor belt, for example; the piece of raw material, in other words, ought to have a width and length of at least 2 mm. The size is valid advantageously for all dimensions, including the height. It is useful if the individual raw-material pieces are larger, having a size, for example, of at least 50 mm, preferably at least 100 mm. On the other hand, the handling of thin raw-material pieces with a large surface area is also difficult in the context of conveying, and for this reason the raw-material pieces, after a possible comminution step, ought at most to have a size of 2000 mm. A maximum size of several 100 mm is preferred.

The comminuting step may optionally also be carried out after the step of cleaning or of detachment of surface coverings.

Separation of the raw-material pieces may be necessary ahead of the actual analysis, in order to allow the raw-material pieces to be analyzed without the analysis of certain raw-material pieces being hindered by other raw-material pieces. In technical conveying tents, the raw-material pieces may be separated by disposing a plurality of modules one after the other, which move the pieces of raw material at different speeds. For example, a first module may move the raw-material pieces at a relatively low speed of, for example, 5 m/min. From this module, the raw-material pieces are transferred to a further module, which moves the raw-material pieces at a significantly higher speed of, for example, 180 m/min. In this way, the distance between the raw-material pieces is deliberately increased—that is, there is separation, which permits separate analysis. As and when required, between the modules with minimum and maximum speed, further modules with speed regulation among one another may be disposed, to move the raw-material pieces at moderate speeds. A typical speed cascade is for instance as follows: 5 m/min-25 m/min-100 m/min-180 m/min. If necessary, after the raw-material pieces have been separated, the speed can be reduced again in order to allow the analysis to be carried out. The modules in question may be either vibratory conveyors or conveyor belts, with the modules featuring lower speed typically being vibratory conveyors, and the modules featuring higher speed typically being conveyor belts. More particularly, the module featuring minimum speed may be a vibratory conveyor (vibratory chute or shaker slide), and the module featuring maximum speed may be a conveyor belt. The use of vibratory conveyors at the start of separation is also useful in the sense that it allows raw-material pieces connected loosely to one another, examples being slightly hooked raw-material pieces, to be separated from one another. It may optionally be sufficient for separation to be carried out only to such an extent that a few raw-material pieces are present together—in other words, it is not necessary in every case to carry out separation in the sense that all of the raw-material pieces are completely separated.

In order to determine the locations at which spectroscopic analysis of the composition is possible, the positions of the raw-material pieces and also spatial information relating to the raw-material pieces can be determined. Determining spatial information is understood in particular as determining the shape of the raw-material pieces completely or partially. The position is, in particular, the position of the piece of raw material on the transport means.

In order to increase the meaningfulness of the analysis conducted, it is also possible to analyze two or more locations of each piece of raw material for their composition; in other words, at a number of locations there must first be exposure to cleaning pulses and then exposure to analysis pulses in order to allow the respective composition to be determined. The results are evaluated statistically, and then sorting is carried out depending on the statistically determined composition.

Determining the position of the raw-material pieces can be done by means of a 3D scanning step, which may also serve for obtaining spatial information about the raw-material pieces. It is possible accordingly to capture the shape of the raw-material pieces. The spatial information containing the raw-material pieces, especially the shape, is automatically evaluated to ascertain those positions at which spectroscopic analysis is possible without problems. The analysis can be significantly accelerated in this way, since the number of unsuccessful analysis steps is minimized. 3D scanning technologies, usually performed by means of a laser, are familiar to the skilled person from the prior art and are diversely used, for the purpose, for example, of determining the shape of dental arches, in rapid prototyping, etc. Referenced merely by way of example is the review article by W. R. Scott, G. Roth, ACM Computing Surveys, vol. 35, 2003, pp. 64-96 "View Planning for Automated Three-Dimensional Object Reconstruction and Inspection".

Instead of capturing position and shape by means of 3D scanning, other possibilities are conceivable as well. For example, in the case of metals, the position of the piece of raw material can be determined by electromagnetic induction. For this purpose, coils may be provided, beneath the transport means, for example, which together with a capacitor form a resonant circuit, with the position of a metallic raw-material piece being captured electronically as a result. Apparatus allowing the presence of a metallic article to be detected by electromagnetic induction is known fundamentally to the skilled person.

Another possibility for obtaining spatial information about the raw-material pieces is by determining a height line of each piece of raw material by way of the light propagation time, by means of a (pulsed) laser parallel to the direction of transport. The purpose of such a procedure, for raw-material pieces which exhibit a sharp difference in height within each piece, or from one piece to another, is to prepare the subsequent analysis procedure so as to allow a light-optical method to undertake sufficiently precise focusing for the actual measurement. The spatial information obtained is used to specify the locations at which compositional analysis takes place in the subsequent step. By determining the height line, the cycle time of the measurement procedures is increased, and the accuracy of measurement goes up. Moreover, the effect of any relative movements of the raw-material pieces relative to the transport means is largely eliminated by the measurement technology.

The sorting procedure may take account not only of the composition but also of the mass of the raw-material pieces, so as to end up, where possible, with a target fraction which has the desired target composition overall. Another term used in this context is that of assorting, and an additional weighing procedure may be necessary. A process of this kind is disclosed in DE 10 2012 024 816 A1; the process of the invention can be used as part of the assorting process described herein.

Sorting takes place via an automated process, using a computer and/or an electronic data-processing means. The raw-material pieces are assigned to individual target fractions, it also being possible, optionally, for a residual fraction to be provided, as a repository for raw-material pieces which cannot be usefully used, or for raw-material pieces which contain species detrimental to the material. Likewise to be rejected in the sorting process are raw-material pieces which are found not to be analyzable or which are pieces which have been inadequately processed or are composed of too many different substances, such as, for instance, composite materials, complete electric motors, or the like.

Sorting may take place by means of common methods, mechanically or pneumatically, by—for example—scrap metal, conveyed continuously on a conveyor belt, being guided in accordance with requirements and collected in different provided containers. The feed to the target fraction may take place, for example, by means of air blasts, as is described in DE 100 29 951 A1. Also possible, however, is the use of mechanical gates, gripper devices, or the like.

The sorting procedure may also take account of small amounts of alloying constituents, which may preferably be below 800 ppm. With further preference, even amounts below 500 ppm, more particularly below 100 ppm, very preferably below 10 ppm, are detected in the analysis and taken into account for sorting.

In addition to the process of the invention, the invention also relates to an apparatus for implementing the process of the invention. This apparatus has:

a laser which is capable of generating first laser pulses for detaching surface coatings and contaminants from raw-material pieces, and second laser pulses for converting exposed material of the raw-material pieces into a plasma, a spectrometer for analyzing the light emitted by the plasma, a transport means for moving the raw-material pieces in conveying direction, a control unit which controls the pulse energy, pulse duration, and pulse frequency of the laser and which moves the first laser pulses over an area of the raw-material pieces, and frees said area from surface coatings and/or contaminants, said area being greater than the area of the raw-material pieces that is embraced by the second laser pulses, and which keeps constant the focal diameter and the focal point of the laser beam between the first and second laser pulses, and a sorting unit which automatedly assigns the raw-material pieces to one or more target fractions depending on the composition found.

Otherwise, the apparatus of the invention is subject mutatis mutandis to all the observations, including possible embodiments, of the invention.

BRIEF DESCRIPTION OF DRAWING

FIG. 1 is an illustration of the sorting system.

The invention is elucidated in more detail by means of the appended FIG. 1. This FIGURE shows a transport means 1, on which a multiplicity of raw-material pieces are moved in conveying direction 2. In order to simplify the illustration, the raw-material pieces 5 here are arranged relatively regularly on the transport means 1, although in practice this is usually not the case. The transport means 1 is a conveyor belt which is driven by rollers 4. At the end of the conveyor belt there is a series of collecting containers A, B, C, R, in which the raw-material pieces 5 are collected according to composition, to allow them to be used again subsequently. In this case, the collecting containers A, B, C are collecting containers for re-use of the raw-material pieces 5, whereas the collecting container R is a residuals collecting container which collects those raw-material pieces 5 which are not amenable to further use or for which no compositional analysis was possible.

Sorting into the collecting containers A, B, C, R takes place in dependence on the composition found for the raw-material pieces 5. This is done by means of a laser 3, which generates laser pulses, a distinction being necessary between cleaning pulses 6 and analysis pulses 7. A particular piece 5 of raw material is subjected first in each case to cleaning pulses 6 and subsequently in each case to analysis pulses 7. The control unit ensures that the analysis pulses are directed at those locations on the raw-material pieces 5 at which removal of material by cleaning pulses 6 has taken place beforehand. For this purpose, the control unit takes account of the situation of the raw-material pieces 5, the speed of the transport means 1, and the guidance of the cleaning pulses 6 and of the analysis pulses 7.

Correspondingly, a meaningful determination of the composition of the raw-material pieces 5 is possible with the aid of the analysis pulses 7. The analysis pulses 7 coming from the laser 3 convert parts of the piece 5 of raw material into the plasma state; the compositional analysis takes place by means of a spectrometer, not shown here, which captures the light emitted by the plasma. The process is therefore one of LIBS (laser-induced breakdown spectroscopy); the respective composition of a piece 5 of raw material can be determined from the light captured by the spectrometer. Subsequently, a control unit, again not shown here, ensures that the particular piece of raw material analyzed is assigned to the correct collecting container A, B, C, R.

The invention claimed is:

1. A process for sorting reusable raw-material pieces said process comprising:
   continually moving said raw-material pieces in a conveying direction using a transport means,
   analyzing the chemical composition of the raw-material pieces using laser-induced breakdown spectroscopy, and
   implementing an automated sorting of the raw-material pieces depending on the composition found, the process further comprising
   in a first step, using a laser to subject the raw-material pieces to a plurality of first laser pulses in order to remove surface coatings and contaminants from the raw-material pieces,
   in a second, subsequent step, using the same laser as was used to subject the raw-material pieces to a plurality of said first laser pulses to direct one or more second laser pulses at portions of the raw-material pieces from which the surface coatings and contaminants have been removed, with exposed material of the raw-material pieces being converted by the second laser pulses into a plasma,
   keeping the focal diameter and the focal point of the laser beam constant between the first laser pulses and the second laser pulses;
   ensuring that the area of the raw material pieces over which the first laser pulses are moved and which is freed from surface coatings and contaminants is greater than the area of the raw material pieces embraced by the second laser pulses; and
   migrating the first laser pulses over the raw-material pieces so as to repeatedly act on closely adjacent points of the raw-material pieces, thereby causing the first laser pulses to overlap.

2. The process as claimed in claim 1, further comprising freeing the area of the raw-material pieces from at least one of said surface coatings and said contaminants by greater than at least the focal diameter and positional tolerances of the area of the raw-material pieces embraced by the second laser pulses.

3. The process as claimed in claim 1, further comprising freeing the areas of the raw-material pieces from at least one of said surface coatings and said contaminants and embracing said surface coatings and said contaminants either singly or multiply using the first laser pulses depending on the nature and thickness of at least one of the surface coatings and the contaminants.

4. The process as claimed in claim 1, further comprising guiding the first laser pulses along at least two dimensions over the areas of the raw-material pieces that are to be freed from at least one of said surface coatings and said contaminants.

5. The process as claimed in claim 1, further comprising disposing the focal diameter of the laser beam is between 60 µm and 140 µm.

6. The process as claimed in claim 1, further comprising generating a pulse length of the first laser pulses and second laser pulses is between 0 ns and 200 ns.

7. The process as claimed in claim 1, generating a thermal plasma using the second thermal pulses.

8. The process as claimed in claim 1, further comprising using a solid-state laser.

9. The process as claimed in claim 1, further comprising using a fiber laser.

10. The process as claimed in claim 1, further comprising moving the raw-material pieces at a speed of >0.1 m/s in the conveying direction.

11. The process as claimed in claim 1, further comprising sorting steel-scrap pieces.

12. The process as claimed in claim 11, further comprising sorting galvanized steel-scrap pieces.

13. The process as claimed in claim 1, further comprising sorting nonferrous-metal-scrap pieces.

14. The process as claimed in claim 1, further comprising directing the first laser pulses at raw-material pieces further back in the conveying direction, and directing the second laser pulses (7) at raw-material pieces further forward in the conveying direction, and continually alternating between the subjection of raw-material pieces further back in the conveying direction to first laser pulses and of raw-material pieces further forward in the conveying direction to second laser pulses.

15. An apparatus for sorting reusable raw-material pieces, the apparatus comprising:
    a laser for generating first laser pulses for detaching surface coatings and contaminants from raw-material pieces, and second laser pulses for converting exposed material of the raw-material pieces into a plasma,
    a spectrometer for analyzing light emitted by the plasma,
    a transport means for moving the raw-material pieces in a conveying direction,
    a control unit which controls the pulse energy, pulse duration, and pulse frequency of the laser and which moves the first laser pulses over an area of the raw-material pieces, and frees said area from at least one of said surface coatings and said contaminants, said area being greater than the area of the raw-material pieces that is embraced by the second laser pulses,
    wherein the control unit is capable of migrating said first laser pulses over the raw material pieces so that the first laser pulses repeatedly act on closely adjacent points of the raw material pieces such that the first laser pulses overlap, wherein the control unit keeps constant the focal diameter and the focal point of the laser beam between the first and second laser pulses, and a sorting unit which automatically assigns the raw-material pieces to one or more target fractions depending on the composition found.

16. The apparatus as claimed in claim 15, wherein the pulse length of the first and second laser pulses is between 60 ns and 120 ns.

17. The apparatus as claimed in claim 15, wherein the raw-material pieces are moved with a speed of >2 m/s in the conveying direction.

* * * * *